United States Patent Office 3,316,083
Patented Apr. 25, 1967

3,316,083
BRIQUETTING OF FOUNDRY MATERIALS
Jack P. Parsons, Bethany, Ill., assignor to Mueller Co., Decatur, Ill., a corporation of Illinois
No Drawing. Filed June 10, 1964, Ser. No. 374,184
9 Claims. (Cl. 75—44)

The invention relates to a method for preparing briquettes of finely divided scrap metal such as cast iron machine borings and turnings.

Economical re-use of machine turnings has long been a problem of the foundry industry. Cast iron machine boring and turnings are normally sold for 10 to 15 dollars per ton to scrap dealers.

Today there are three methods used by foundries to reclaim machine turnings, (1) compression briquetting, (2) chips injectors and (3) electric coreless induction melting. For compression briquetting the initial equipment cost may be as high as $50,000 per unit, in order to produce sound briquettes, and a large operation is required for profitable operation. In the chip injector method, metal chips are injected or blown into the melt zone of the cupola with a 90% to 95% metal recovery. The disadvantages of this method are that hot melting temperatures are required and, again, installation of the equipment is expensive, presently costing perhaps $6,000, with additional material-handling equipment being required to accommodate chip hoppers, etc. In addition, the lack of cleanliness of the material limits the use of this method.

The electric coreless induction melting method has a similar disadvantage in requiring expensive equipment for melting the borings. This equipment requires refractory lining materials of relatively short life, and which, consequently, require periodic replacement which adds to the cost of the method. Again in this method, the borings usually must be pre-cleaned and dried prior to melting, which also add to the cost of the process.

Accordingly, there has been a continuing need for an economical means of remelting machine turnings, particularly for relatively low tonnage foundries.

The present invention provides a method for economically converting waste machine turnings into a form which is useful as a melting material in various types of melting furnaces for both large and small operations.

The object of this invention is accordingly, to provide a novel, inexpensive method for forming briquettes from machine borings and turnings, particularly of cast iron, using low cost adhesive binders.

A further object of this invention is to provide an inexpensive briquette containing scrap metal particles, particularly cast iron borings and turnings, for use in melting furnaces, with the achievement of a high metal recovery.

According to the invention in its broadest form a quantity of metallic chips may be mixed with aqueous sodium silicate and blended in a suitable mixer such as a Simpson muller (or a concrete mixer or laboratory type muller). Sufficient water is then added to the mixture to provide a wet slurry. Ordinary solid starch is then added with continuous mixing until the mixture becomes heavily viscous and of a trowelling consistency which normally takes about five minutes. This thick plastic mixture or slurry is then placed in a suitable mold and compressed to form a briquette.

For instance, a cast iron brick form with a matching squeeze plate for ejecting the briquette may be used to compress the briquette. Two to three pounds of the briquetting composition may be placed in the form, after which the form is covered with a match plate. Pressure is then applied thereon of approximately 90 p.s.i., optimumly in the range of from 70 to 100 p.s.i. After from ¼ to 1¼ minutes, in usual operations, the pressure is then released and the briquettes ejected from the mold.

The briquettes may then simply be set aside and exposed to ambient air. After typically 3 to 7 days, usually three days, the briquettes are found to be satisfactorily dry and of adequate strength for ordinary material handling, without any further treatment.

The simple use of air drying, according to this invention, is highly advantageous because of the low cost. Briquettes are presently conventionally dried in ovens but this requires heat energy.

After drying, the briquettes made according to this invention may then be utilized in foundry operations with a minimum metal recovery of 80% to 85%.

In addition to the feature that the briquettes of this invention have adequate strength and form without excessive pressures and without any required heating, it is a some adhesiveness, has quick drying power, as well as being a hot strength binder to aid the briquettes in reaching the melt zone of the cupola.

The briquetting ingredients are also economical. The sodium silicate used may be any commercial grade, having from 33 to 52% solids in aqueous solution, the preferred product corresponding to that produced by Diamond Alkali Co. #33 containing 33% solids. This sodium silicate composition provides good mixing quality and some adhesiveness, has quick drying power, as well as being a hot strength binder to aid the briquettes in reaching the melt zone of the cupola.

The starch employed in the mixture may be any water-soluble industrial grade starch such as Staramic 314, produced by A. E. Staley Co., or a comparable grade. This starch composition provides a desirably thick adhesive quality to the mixture.

The third additive, water, is added to the mixture to control the viscosity and consistency of the slurry.

No further ingredients are required, in contrast to some prior art practices which need highly complicated multi-component blends.

On the basis of 100 parts cast iron borings, the briquetting mixture used in preparing the briquettes according to this invention may typically contain from 3 to 10, preferably about 4 to 6, and most preferably approximately 5 parts aqueous sodium silicate containing from 33 to 52 percent solids; 3 to 10, preferably 4 to 6, and most preferably approximately 5 parts water-soluble starch; and an amount of water to provide a suitable trowelable consistency to the complete mixture including the iron or other metal borings. Usually it is effective to employ the aqueous sodium silicate, starch and water components in approximately equal weight quantities, to a total of about 15% by weight of the metal borings or turnings. The amount of each ingredient will vary with respect to the condition and nature of the borings, for instance, whether they are fine, coarse, wet, dry or oily.

The dried briquette should contain 100 parts of finely divided metal; sodium silicate in an amount of 1 to 3.3 parts, preferably 1.3 to 2 parts; and water-soluble starch in an amount of 3 to 10 parts, preferably 4 to 6 parts, for example 5 parts.

It is to be understood that not only cast iron but other metal borings and turnings such as steel, brass, etc. can be formed into briquettes using the method of this invention.

*Example*

In accordance with the foregoing description of this invention, 100 pounds of cast iron borings were mixed with 5 pounds of a 33% aqueous solution of sodium silicate (Diamond Alkali Co., No. 33). The resulting composition was placed in a Simpson muller and thoroughly blended. Five pounds of water was then added to the composition and admixed therewith to provide a wet slurry. Five pounds of an industrial grade water-soluble starch (A. E. Staley Co., Staramic 314) was then added and blended with the composition, the mixture becoming heavily viscous after about 5 minutes.

This material was then troweled into a brick form having a mold capable of receiving approximately 3 pounds of the material, and was then compressed under 90 pounds of pressure. The pressure was then released and the briquette removed and placed on a shelf and allowed to air dry for three days. This briquette was found to possess adequate strength for ordinary material handling, and on subsequent melting in a pouring ladle containing molten iron, a melt recovery of approximately 85% was achieved.

It will be apparent that within the principles disclosed above this invention may be practiced according to various arrangements of apparatus and methods of carrying out the individual process steps, including those specifically shown as well as others which will be obvious to one skilled in the art reading this disclosure. Accordingly, this invention is limited only by the spirit and scope of the following claims.

I claim:
1. A method for making briquettes consisting essentially in mixing metal borings and turnings with a briquetting composition consisting essentially of aqueous sodium silicate, water-soluble starch, and water, compressing the resulting mixture into a briquette and drying the same by exposure to ambient air conditions.

2. A method for making briquettes comprising mixing 100 parts metal borings and turnings, about 3 to 10 parts aqueous sodium silicate containing 33 to 52 percent by weight solids, about 3 to 10 parts water-soluble starch, and sufficient water to provide a suitable trowelable consistency to the complete mixture including the metal borings and turnings, compressing the resulting mixture into a briquette and drying the same by exposure to ambient air conditions.

3. A method according to claim 2 wherein the amount of aqueous sodium silicate containing 33 to 52 percent by weight solids is about 4 to 6 parts and the amount of water-soluble starch is about 4 to 6 parts.

4. A method for making briquettes comprising mixing 100 parts metal borings and turnings, about 5 parts aqueous sodium silicate containing about 33% by weight solids, about 5 parts water-soluble starch, and about 5 parts water, compressing the resulting mixture into a briquette and drying the same by exposure to ambient air conditions.

5. A method for making briquettes comprising mixing 100 parts cast iron borings and turnings, about 3 to 10 parts aqueous sodium silicate containing 33 to 52 percent by weight solids, about 3 to 10 parts water-soluble starch, and sufficient water to provide a suitable trowelable consistency to the complete mixture including the cast iron borings and turnings, compressing the resulting mixture into a briquette and drying the same by exposure to ambient air conditions.

6. In a method for making briquettes the improvement which consists essentially in using as the briquetting composition a mixture consisting essentially of 100 parts metal borings and turnings, 3 to 10 parts aqueous sodium silicate containing 33 to 52 percent by weight solids, about 3 to 10 parts water-soluble starch, and sufficient water to provide a suitable trowelable consistency to the complete mixture including the metal borings and turnings, compressing the resulting mixture into a briquette and drying the same by exposure to ambient air conditions.

7. A dried briquette suitable for addition to melting furnaces consisting essentially of 100 parts finely divided metal borings and turnings about 1 to 3.3 parts sodium silicate and about 3 to 10 parts water-soluble starch.

8. A dried briquette suitable for addition to melting furnaces consisting essentially of 100 parts finely divided metal borings and turnings about 1.3 to 2 parts sodium silicate and about 4 to 6 parts water-soluble starch.

9. A dried briquette suitable for addition to melting furnaces consisting essentially of 100 parts finely divided metal borings and turnings, about 1.65 parts sodium silicate and about 5 parts water-soluble starch.

References Cited by the Examiner

UNITED STATES PATENTS

| | | | |
|---|---|---|---|
| 1,030,114 | 6/1912 | Neil | 106—80 |
| 1,421,924 | 7/1922 | Eberlin et al. | 106—80 |
| 1,574,878 | 3/1926 | Gail | 75—44 |
| 1,606,481 | 11/1926 | Rochow | 106—80 X |
| 2,044,908 | 6/1936 | Kinzie. | |
| 2,078,836 | 4/1937 | Carter | 106—80 |

DAVID L. RECK, *Primary Examiner.*

H. W. TARRING, *Assistant Examiner.*